(12) United States Patent
Nam et al.

(10) Patent No.: US 7,927,000 B2
(45) Date of Patent: *Apr. 19, 2011

(54) BACKLIGHT ASSEMBLY AND COVER FOR A COMPACT DISPLAY APPARATUS

(75) Inventors: Young-Joo Nam, Daegu (KR); Sang-Hoon Park, Yongin-si (KR); Dong-Gyun Ra, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/838,369

(22) Filed: Jul. 16, 2010

(65) Prior Publication Data

US 2010/0283805 A1 Nov. 11, 2010

Related U.S. Application Data

(63) Continuation of application No. 11/860,236, filed on Sep. 24, 2007, now Pat. No. 7,784,991.

(30) Foreign Application Priority Data

Sep. 25, 2006 (KR) .................. 10-2006-0092667

(51) Int. Cl.
*F21V 7/04* (2006.01)

(52) U.S. Cl. ...................... 362/613; 362/633

(58) Field of Classification Search .................. 362/612, 362/613, 633, 634, 600, 632
See application file for complete search history.

(56) References Cited

U.S. PATENT DOCUMENTS

| 4,967,317 | A * | 10/1990 | Plumly ......................... 362/613 |
| 7,217,004 | B2 * | 5/2007 | Park et al. ..................... 362/240 |
| 7,465,082 | B2 | 12/2008 | Sakamoto et al. |
| 2006/0120107 | A1 | 6/2006 | Pao et al. |

OTHER PUBLICATIONS

European search report of Jun. 30, 2008.

* cited by examiner

*Primary Examiner* — John A Ward
(74) *Attorney, Agent, or Firm* — Innovation Counsel LLP

(57) ABSTRACT

A back cover for a backlight assembly capable of achieving a more compact a display apparatus includes a cover element, a line portion, and a plurality of point light sources. The cover element includes a metallic layer, and the cross-section of the cover element has an L-shape. The line portion is formed over the cover element. The point light sources are mounted on the surface of the cover element to receive a driving voltage from the line portion. A bottom cover portion of the cover element covers an opening portion. A side cover portion of the cover element faces the side wall. The point light sources mounted on the cover element emit light on a side surface of a light guide plate.

20 Claims, 11 Drawing Sheets

BACKLIGHT ASSEMBLY AND COVER FOR A COMPACT DISPLAY APPARATUS

CROSS-REFERENCE TO RELATED APPLICATIONS

This application is a continuation of U.S. patent application Ser. No. 11/860,236 filed on Sep. 24, 2007, which claims priority under 35 U.S.C. §119 to Korean Patent Application No. 2006-92667, filed on Sep. 25, 2006 in the Korean Intellectual Property Office (KIPO), the contents of which are herein incorporated by reference in their entirety.

BACKGROUND OF THE INVENTION

1. Field of the Invention

The present invention relates to a display apparatus having a back cover and a backlight assembly that permits a reduction in the overall size of the display apparatus.

2. Description of the Related Art

Generally, a liquid crystal display (LCD) apparatus includes a backlight assembly that provides light to a display panel so that a displayed image is viewable in a low-light area. Mobile communications devices and digital cameras, for example, mostly include a light-emitting diode (LED) as the light source of the backlight assembly.

LCD apparatus for use in laptops and monitors mostly include a cold cathode fluorescent lamp (CCFL) as the light source of the backlight assembly. However, recently, LEDs have been more frequently used as the light source of the backlight assembly so that the backlight assembly has become lighter and thinner.

The LED is directly disposed under a display area of a display panel when the backlight assembly is a direct-illumination type, but the LED is disposed at an edge of a light guide plate that is directly disposed under the display panel when the backlight assembly is an edge-illumination type. In the edge-illumination type of backlight assembly, a plurality of LEDs is arranged on a flexible printed circuit board (FPCB) which has a flexible resin film and on which lines are printed.

The LEDs are divided into several groups and are controlled for uniformity of brightness. In order to control the LEDs, a plurality of input lines and a plurality of feedback lines are formed on the FPCB. Thus, the width of the FPCB is increased as the number of LEDs increases.

The white LED such as used in a laptop, has better luminance than a red LED, a green LED, and a blue LED, but has worse light reproducibility than the red, green, and blue LEDs. When the red, green, and blue LEDs are used to increase light reproducibility, the input line and the ground line are respectively connected to each of the red, green, and blue LEDs. Thus, the width of the FPCB is further increased.

In addition, when LEDs having high brightness are packaged in a row to be used for the light source, the heat generated from the LED is stored in the FPCB decreasing its life expectancy.

SUMMARY OF THE INVENTION

In an exemplary embodiment of the present invention, the back cover of an LCD display apparatus includes a cover element, a line portion, and a plurality of point light sources. The cover element includes a metallic layer, and a cross-section of the cover element is an L-shape. The line portion is formed over the cover element. The line portion includes an insulating layer and an input line. The insulating layer is formed on the metallic layer. The input line is insulated from the metallic layer by the insulating layer to apply the driving voltage to each point light source. The plurality of point light sources is mounted on the surface of the cover element, to receive a driving voltage from the line portion.

The line portion further includes a ground line. The ground line is insulated by the insulating layer and is electrically connected to each point light source, to output a feedback signal.

In an exemplary backlight assembly according to the present invention, the backlight assembly includes a receiving container, a light guide plate, and a back cover. The receiving container includes a bottom plate and a side wall extended from an edge of the bottom plate. The bottom plate has an opening portion formed adjacent to the side wall. The light guide plate is disposed on the bottom plate. The back cover includes a cover element having a bottom cover portion and a side cover portion, a plurality of point light sources mounted on the cover element to face a side surface of the light guide plate, and a line portion formed over the cover element to apply a driving voltage to the point light sources. The bottom cover portion covers the opening portion to partially support the light guide plate, and the side cover portion is curved from an edge of the bottom cover portion to face the side wall.

The point light sources are mounted on the bottom cover portion. The side cover portion may face an outside of the side wall. A groove into which the point light sources are inserted, may be formed in an inside lower portion of the side wall. The point light sources may be mounted on the side cover portion. The side cover portion may face an inside of the side wall. The side cover portion may face an outside of the side wall, and a hole into which the point light sources are inserted may be formed in the side wall.

The bottom cover portion and the side cover portion may include a metallic layer. The line portion may include an insulating layer formed on the metallic layer, an input line insulated from the metallic layer by the insulating layer, to apply the driving voltage to each point light source, and a ground line insulated from the metallic layer by the insulating layer and electrically connected to the point light source, to output a feedback signal. The input and ground lines may be partially formed on the bottom cover portion, and the input and ground lines may be partially formed on the side cover portion.

Each point light source may include a red light-emitting chip emitting red light, a green light-emitting chip emitting green light, and a blue light-emitting chip emitting blue light. The red, green and blue light-emitting chips may be electrically connected to the input and ground lines, respectively. The red, green, and blue light-emitting chips may be packaged to be one point light source, and the point light sources may be divided into a plurality of groups to be controlled.

The backlight assembly may further include a reflective sheet disposed between the light guide plate and the bottom cover portion.

In an exemplary display apparatus according to the present invention, the display apparatus includes a receiving container, a back cover, a light guide plate, an optical sheet, and a display panel. The receiving container includes a bottom plate and a side wall extended from an edge of the bottom plate. The bottom plate has an opening portion formed adjacent to the side wall. The back cover includes a cover element having a bottom cover portion and a side cover portion, a plurality of point light sources mounted on the cover element, and a line portion formed over the cover element to apply a driving voltage to the point light sources. The bottom cover portion covers the opening portion, and the side cover portion is protruded from the bottom cover portion to face the side wall. The light guide plate is disposed on the bottom cover portion and the bottom plate, for a side surface of the light guide plate to face the point light sources. The optical sheet is disposed on the light guide plate. The display panel is disposed on the optical sheet.

The bottom cover portion and the side cover portion include a metallic layer for dissipating the heat that is generated from the point light sources to the outside of the display apparatus, and an insulating layer formed on the metallic layer. The line portion is insulated from metallic layer by the insulating layer. The line portion includes an input line for applying the driving voltage to each point light source, and a ground line electrically connected to each point light source, to output a feedback signal. The display apparatus may further include a panel driving part applying a panel driving signal to the display panel, and electrically connected to the line portion to control the driving voltage based on the feedback signal.

According to the present invention, a metal core printed circuit board (PCB) on which the point light sources are mounted, is used for the back cover, so that elements of the backlight assembly and the display apparatus and the size thereof may be reduced.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE EMBODIMENTS

Figure 1:
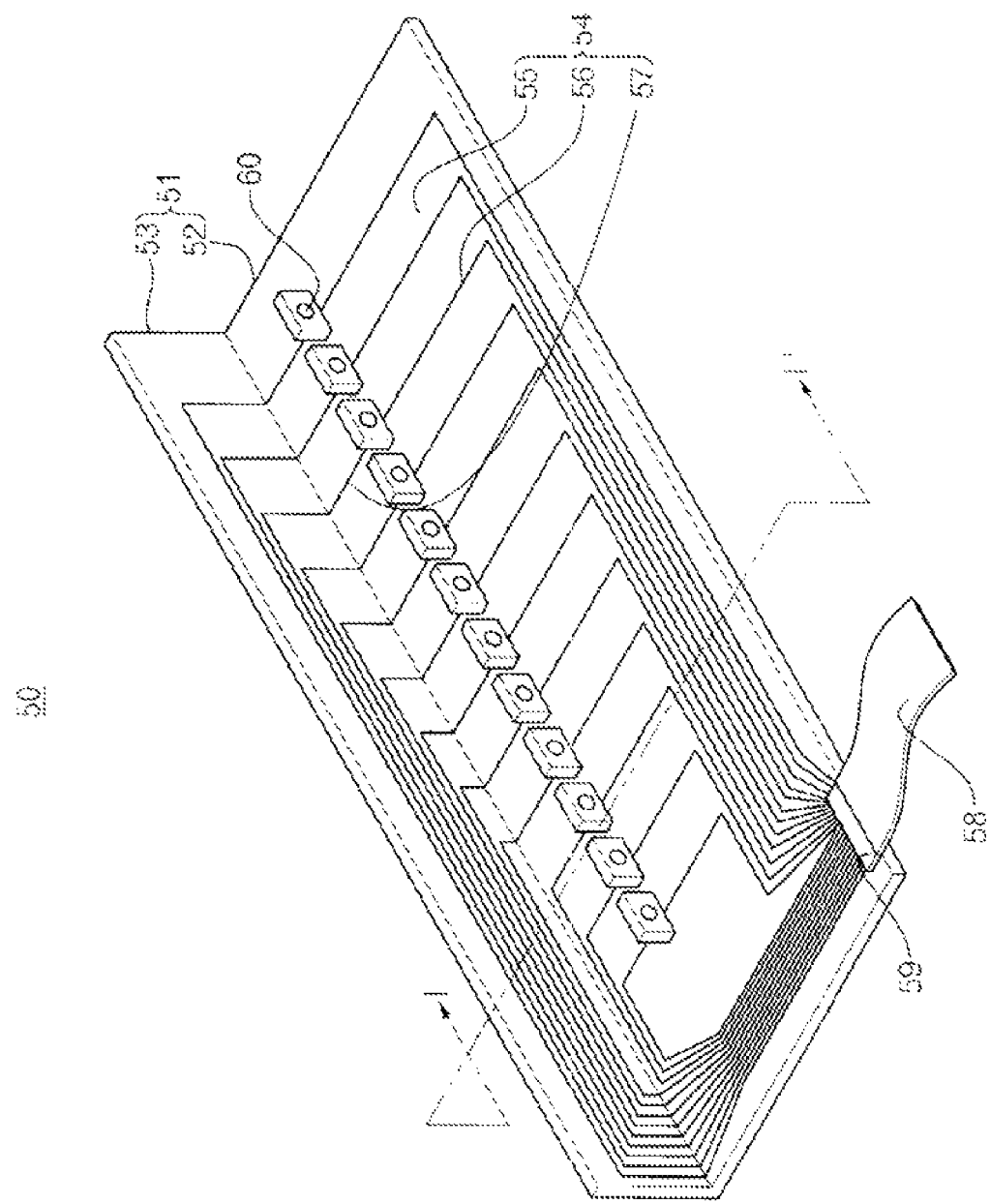
FIG. 1 is a perspective view illustrating a back cover for a display apparatus according to an example embodiment of the present invention.

In the drawings, the size and relative sizes of layers and regions may be exaggerated for clarity. It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Back Cover for Display Apparatus

FIG. 1 is a perspective view illustrating a back cover 50 for a display apparatus according to an example embodiment of the present invention. Referring to FIG. 1, the back cover 50 includes a cover element 51, a line portion 54, and a plurality of point light sources 60.

The cover element 51 includes a bottom cover portion 52 and a side cover portion 53. The bottom cover portion 52 has a plate shape. The side cover portion 53 is extended from an edge of the bottom cover portion 52, so that the cover element 51 has a substantially L-shape. The cover element 51 includes a metallic material. Alternatively, the cover element 51 may include a metallic layer having the L-shaped cross-section.

The point light sources 60 are arranged on the bottom cover portion 52 along a longitudinal direction of the bottom cover portion 52. Alternatively, the point light sources 60 may be mounted on the side cover portion 53.

Figure 2:
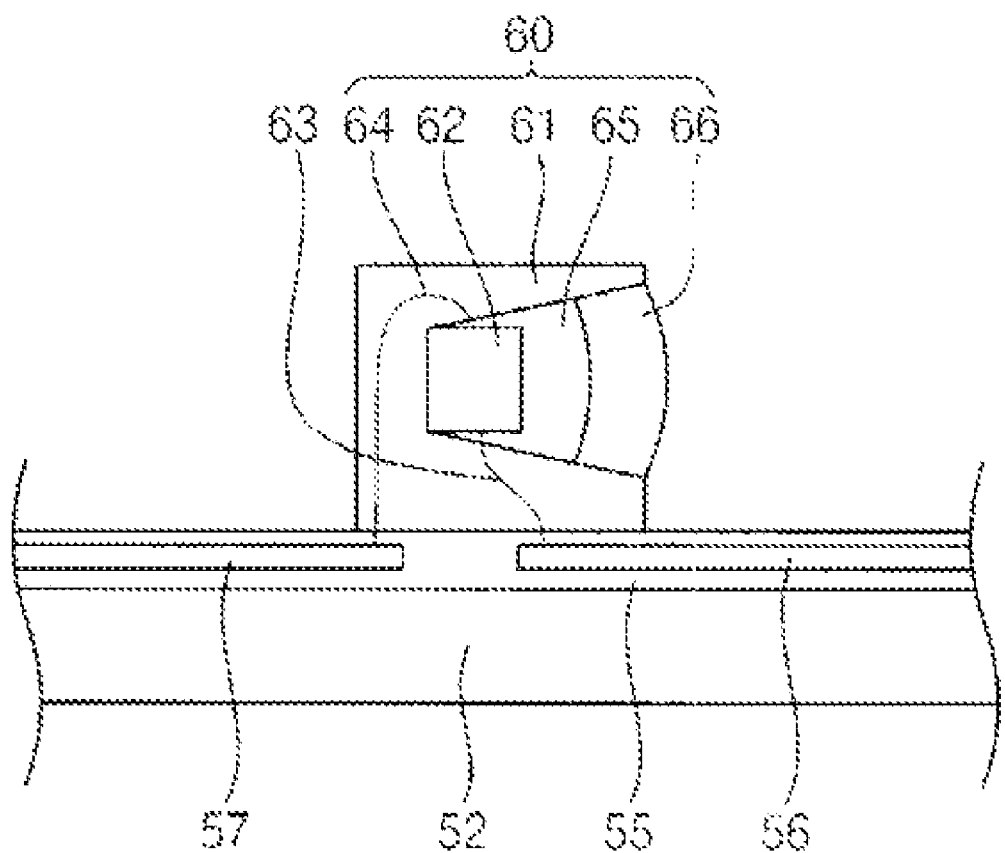
FIG. 2 is a cross-sectional view taken along a line I-I' of the back cover for the display apparatus in FIG. 1.

FIG. 2 is a cross-sectional view taken along a line I-I' of the back cover for the display apparatus in FIG. 1.

Referring to FIGS. 1 and 2, the line portion 54 is formed on a surface of the cover portion 51. When a surface of the bottom cover portion 52 toward a curved direction of the side cover portion 53 is defined as an upper surface of the bottom cover portion 52, the line portion 54 is formed on the upper surface of the bottom cover portion 52 and the upper surface of the side cover portion 53 connected to the upper surface of the bottom cover portion 52. The line portion 54 includes an insulating layer 55, an input line 56, and a ground line 57.

The insulating layer 55 is formed on the upper surface of the bottom cover portion 52 and the upper surface of the side cover portion 53, with a predetermined thickness. The input line 56 and the ground line 57 are patterned on the upper surface of the bottom cover portion 52 and the upper surface of the side cover portion 53, and are insulated by the insulating layer 55. The patterned shape of the input line 56 and the ground line 57 may be changed according to an arrangement of the point light sources 60 and a driving method for the point light sources 60. The insulating layer 55 may be formed on the input line 56 and the ground line 57. Thus, the insulating layer 55 may be formed both on and beneath the input line 56 and the ground line 57.

The input line 56 and the ground line 57 faces each other with respect to the point light source 60. The input line 56 is formed on the insulating layer 55 that is formed on the bottom cover portion 52. The input line 56 is electrically connected to each point light source 60 one by one, to apply a driving voltage to the point light source 60. The ground line 57 is formed on the insulating layer 55 that is formed on the bottom cover portion 52, or alternatively, the ground line 57 is extended from the bottom cover portion 52 to the side cover portion 53. The ground line 57 is drawn out from each point light source 60 one by one, and outputs a feedback signal, for example a current, from the point light source 60.

The point light source 60 may be a white light-emitting diode (LED) or a packaged LED including a red light-emitting chip, a green light-emitting chip, and a blue light-emitting chip. In the packaged LED, the input line 56 and the ground line 57 are electrically connected to each red, green, and blue light-emitting chip. Thus, three input lines 56 and three ground lines 57 are connected to one point light source 60.

Referring to FIG. 2, the point light source 60 may include a housing 61, a light-emitting chip 62, a first connecting terminal 63, a second connecting terminal 64, a fluorescent light layer 65, and a lens 66.

The light-emitting chip 62 is inserted into a groove that is formed on the housing 61. The first connecting terminal 63 electrically connects the input line 56 with the light-emitting chip 62. The second connecting terminal 64 electrically connects the ground line 57 and the light-emitting chip 62. The fluorescent light layer 65 covers the light-emitting chip 62. The light-emitting chip 62 may emit blue light. The fluorescent light layer 65 may include a yellow fluorescent material that receives the blue light and emits the white light. The lens 66 diffuses the white light.

When the point light source 60 includes the red, green, and blue light-emitting chips, each red, green, and blue light-emitting chip emits each red, green, and blue light.

The back cover 50 for the display apparatus may further include a pad portion 59 and a power cable 58.

The pad portion 59, as illustrated in FIG. 1, is formed at a second edge of the bottom cover portion 52 opposite to the first edge. A plurality of input lines 56 and a plurality of ground lines 57 are electrically to the pad portion 59. Thus, the pad portion 59 may be disposed according to the patterns of the input lines 56 and the ground lines 57.

The power cable 58 is connected to the pad portion 59, and may be electrically connected to an external power supply apparatus.

The cover element 51 and the line portion 54 forms a printed circuit board (PCB), and the point light sources 60 are mounted on the PCB. Thus, the back cover 50 for the display apparatus may be used for a backlight source of the display apparatus.

Backlight Assembly

Figure 3:
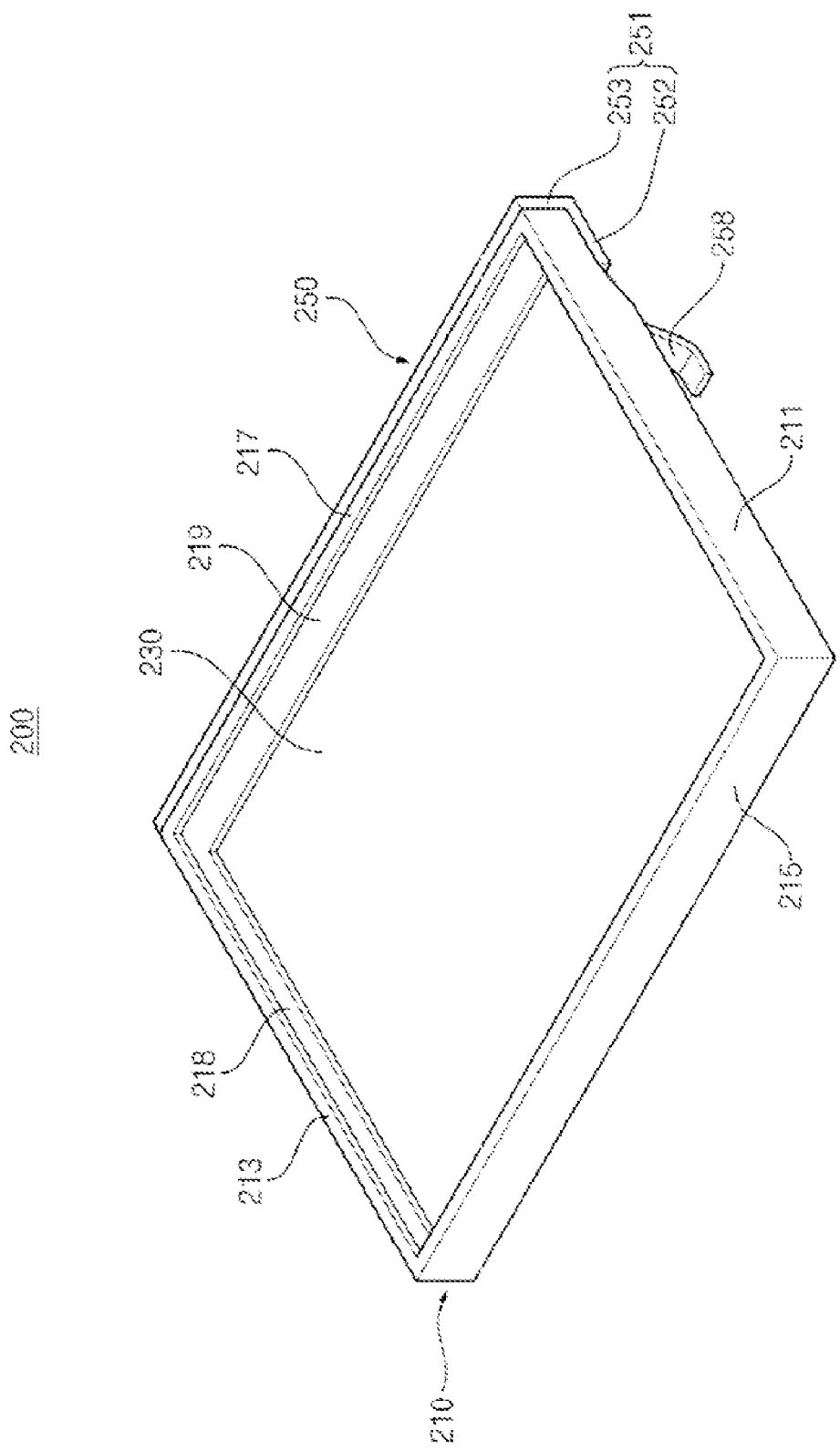
FIG. 3 is a perspective view illustrating a backlight assembly according to an example embodiment of the present invention.
Figure 4:
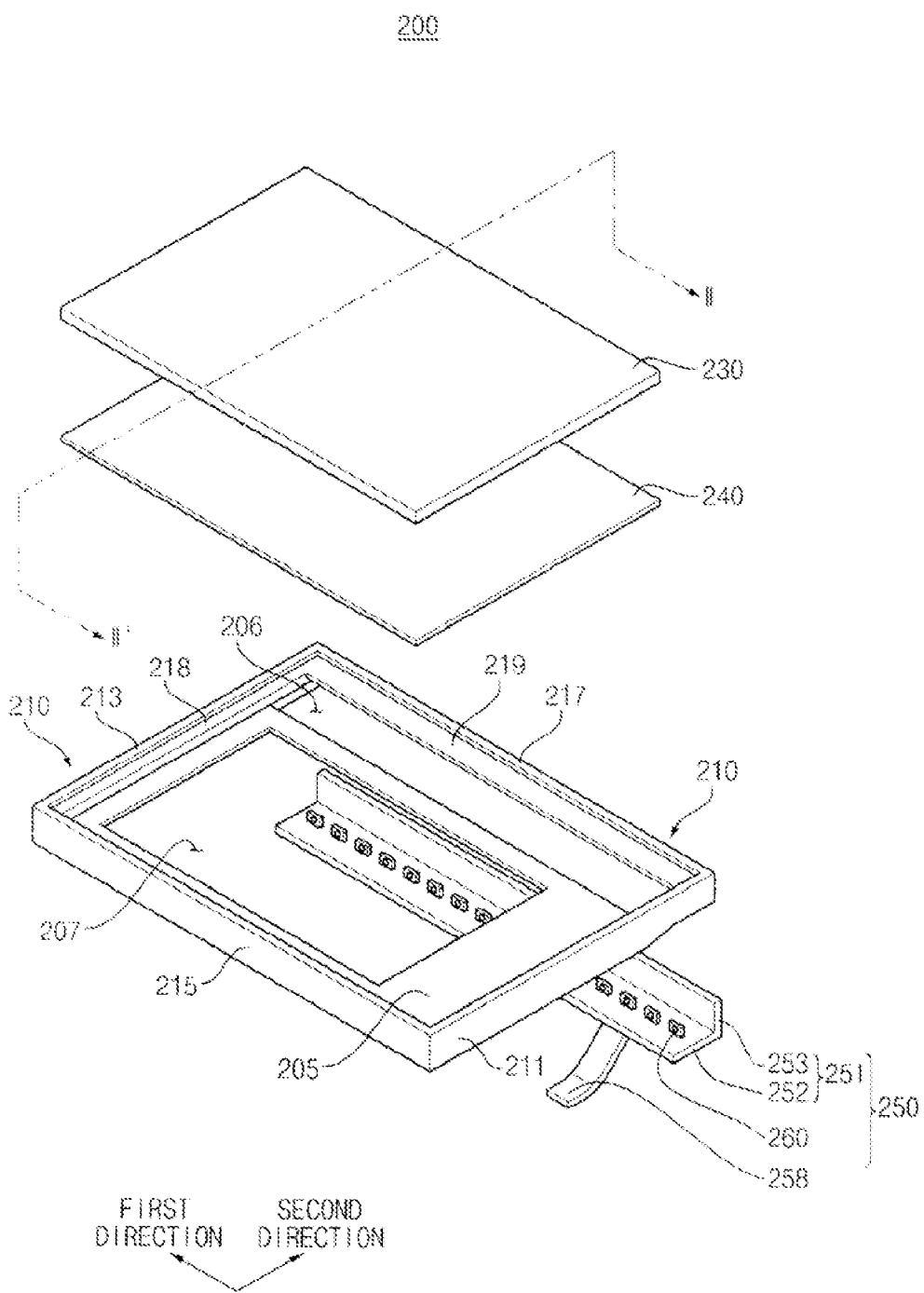
FIG. 4 is an exploded perspective view illustrating the backlight assembly in FIG. 3.

FIG. 3 is a perspective view illustrating a backlight assembly according to an exemplary embodiment of the present invention. FIG. 4 is an exploded perspective view illustrating the backlight assembly in FIG. 3.

Referring to FIGS. 3 and 4, the backlight assembly 200 according to the present example embodiment includes a receiving container 210, a light guide plate 230, and a back cover 250.

The receiving container 210 includes a bottom plate 205, a first side wall 211, a second side wall 213, a third side wall 215 and a fourth side wall 217.

A first opening portion 206 and a second opening portion 207 are formed in the bottom plate 205. The first opening portion 206 is formed around the fourth side wall 217 and extends along a first direction. The second opening portion 207 is formed between the first opening portion 206 and the third side wall 215.

The first side wall 211 faces the second side wall 213, and the third side wall 215 faces the fourth side wall 217. Stepped portions 218 and 219 are formed at insides of the first, second, third and fourth side walls 211, 213, 215 and 217. The width of the stepped portion 219 formed at the fourth side wall 217 is larger than that of the stepped portions 218 formed at the first, second and third side walls 211, 213 and 215. A groove connected to the first opening portion 206 is formed in an inside lower portion of the fourth side wall 217.

Figure 5:
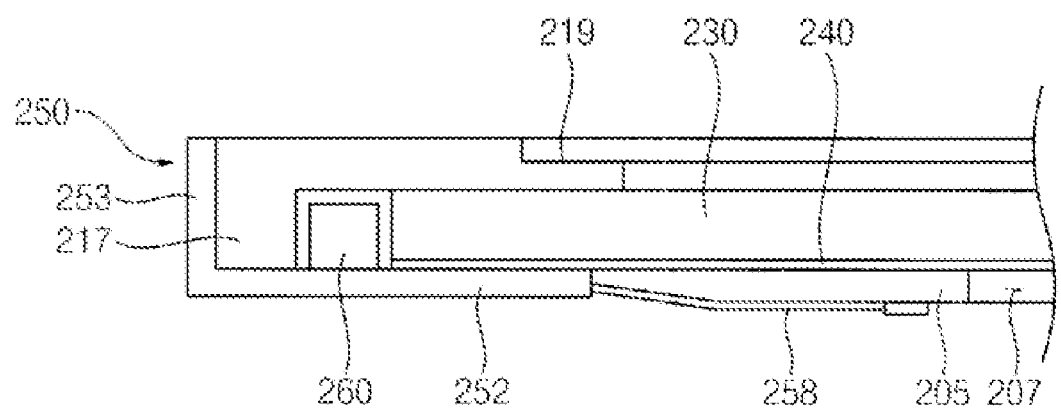
FIG. 5 is a cross-sectional view taken along a line II-II" of the backlight assembly of the FIG. 4.

FIG. 5 is a cross-sectional view taken along a line II-II' of the backlight assembly of the FIG. 4.

Referring to FIG. 5, the backlight assembly 200 may further include a reflective sheet 240. The reflective sheet 240 and the light guide plate 230 are sequentially disposed on the bottom plate 205. The reflective sheet 240 covers the second opening portion 207 formed in the bottom plate 205, and is partially exposed through the first opening portion 206.

An edge of the light guide plate 230 is inserted into the groove formed in the fourth side wall 217. The light guide plate 230 may include materials having good light transmissivity, heat resistance, chemical resistance, mechanical strength and so on. The light guide plate 230 guides the light incident through a side surface of the light guide plate 230, to emit the light having plan light to an upper portion of the light guide plate 230.

Figure 6:
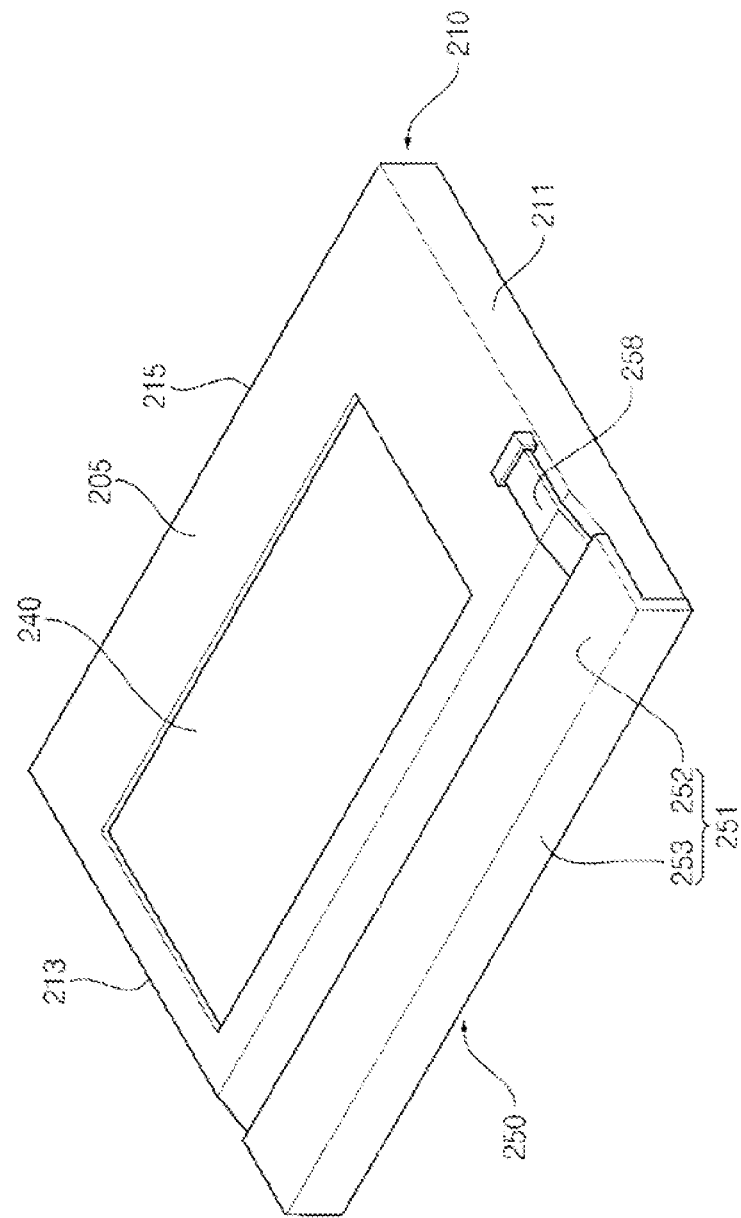
FIG. 6 is a perspective view illustrating a rear surface of the backlight assembly in FIG. 4.

FIG. 6 is a perspective view illustrating a rear surface of the backlight assembly in FIG. 4.

Referring to FIGS. 5 and 6, the back cover 250 according to the present example embodiment is substantially the same as the back cover 50 for the display apparatus explained in FIGS. 1 and 2, except a line portion and a point light source 260. Thus, any further repetitive explanation concerning the above elements will be omitted.

The back cover 250 includes a cover element 251, a line portion, and a plurality of point light sources 260.

The cover element 251 includes a bottom cover portion 252 and a side cover portion 253. The bottom cover portion 252 covers the first opening portion 206 formed in the bottom plate 205. The side cover portion 253 is curved from the bottom cover portion 252 to face an outside of the fourth side wall 217. Thus, the cover element 251 has a substantially L-shape.

The back cover 250 may be combined with the receiving container 210 via a screw combination or an adhesive element. Alternatively, a combination groove or a combination hook may be formed at the fourth side wall 217, and the combination hook or the combination groove may be formed at the side cover portion 253, so that the back cover 250 and the receiving container 210 may be combined with each other.

The point light sources 260 are arranged on the bottom cover portion 252 in a linear shape. Each point light source 260 includes a red light-emitting chip, a green light-emitting chip, and a blue light-emitting chip. The point light sources 260 are inserted into the groove formed in the fourth side wall 217 through the first opening portion 206. The point light sources 260 face a side surface of the light guide plate 230. Red light, green light and blue light exiting from the point light sources 260, are incident into the light guide plate 230 and are mixed in the light guide plate 230, to be a white light. Thus, the light guide late 230 emits the white light.

The line portion includes an insulating layer, an input line, and a ground line.

An insulating layer is formed on the bottom cover portion 252 and the side cover portion 253 to insulate the input line and the ground line. The insulating layer insulates the cover element 251 and the point light source 260. The input line and the ground line are electrically connected to each red, green, and blue light-emitting chip. Thus, three input lines are connected to each of the point light sources 260, and three ground lines are drawn out from each of the point light sources 260. The input lines are formed on the bottom cover portion 252. The ground lines are formed on the bottom cover portion to be extended to the side cover portion 253. The input lines and the ground lines are electrically connected to a pad portion that is formed at an edge of the bottom cover portion 252. A power cable 258 is electrically connected to the pad portion. The power cable 258 is arranged along an inclined surface of the bottom plate 205.

The back cover 250 emits the light to the light guide plate 230, and covers opening portions formed in the bottom plate 205 of the receiving container 210. Thus, the number of elements for the backlight assembly 200 and the display apparatus having the back cover 250 may be reduced.

In addition, the cover element may have the substantially L-shape, and the line portion may be formed on the bottom cover portion 252 and the side cover portion 253. Thus, an area on which the line portion may be formed is extended, so that the number and the kinds of the LEDs formed on the back cover may be increased, although size of the backlight assembly is not increased.

In addition, the cover element 251 exposed to the exterior may include a metallic material or may include a metallic layer. Thus, much of heat generated from the point light sources 260 may be more efficiently dissipated to the exterior through the cover member.

Figure 7:
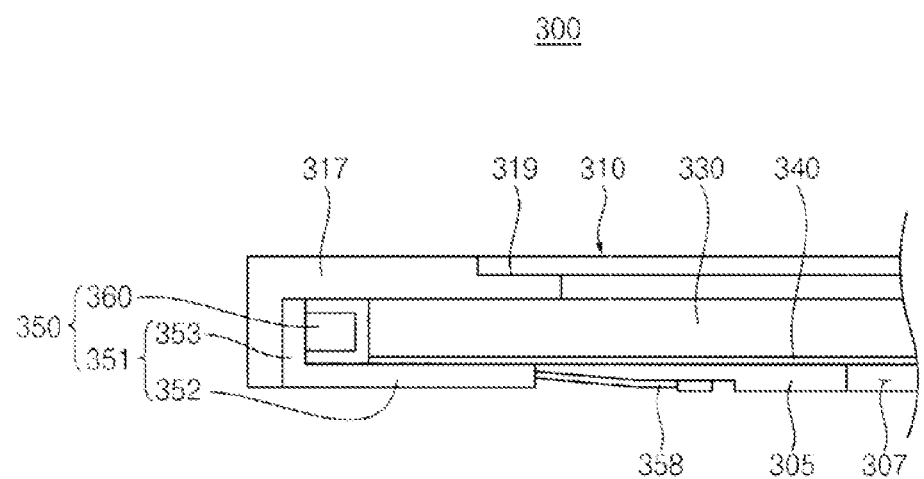
FIG. 7 is a cross-sectional view illustrating a backlight assembly according to another example embodiment of the present invention.

FIG. 7 is a cross-sectional view illustrating a backlight assembly according to another example embodiment of the present invention.

Referring to FIG. 7, the backlight assembly 300 according to the present example embodiment includes a receiving container 310, a light guide plate 330, a reflective sheet 340, and a back cover 350. The backlight assembly 300 according to the present example embodiment is substantially the same as the backlight assembly 200 explained in FIGS. 3 to 6, except the back cover 350. Thus, any further repetitive explanation concerning the above elements will be omitted.

The back cover 350 includes a cover element 351, a line portion, and a plurality of point light sources 360.

The cover element 351 has substantially the same shape as the cover element 251 illustrated in FIGS. 3 to 6. The cover element 351 includes a bottom cover portion 352 and a side cover portion 353. The bottom cover portion 352 covers a first opening portion formed in a bottom plate 305 of the receiving container 310. The side cover portion 353 is protruded from an edge of the bottom cover portion 352, to face an inside of a fourth side wall 317 of the receiving container 310.

The line portion includes an insulating layer, an input line, and a ground line. The line portion is substantially the same as the line portion explained in FIG. 6, except patterns of the input line and the ground line.

The point light sources 360 are substantially the same as the point light sources 260 explained in FIG. 6, except that the point light sources 360 are mounted on the side cover portion 353. The point light sources 360 are arranged along a longitudinal direction of the side cover portion 353 in a line. The point light sources 360 face a side surface of the light guide plate 330.

When the point light sources 360 are mounted on the side cover portion 353, size of the area from the point light sources 360 to an upper portion of the side cover portion 353 may be small so that the input line and the ground line may be not formed on the area. However, in FIG. 7, all of the input line and the ground line may be extended from the point light sources 360 to the bottom cover portion 352, thereby increasing the area on which the input line and the ground line are mounted. Alternatively, a first portion of the input line and the ground line may be formed from the point light sources 360 to the upper portion of the side cover portion 353, and a second portion of the input line and the ground line may be formed from the point light sources 360 to the bottom cover portion 352.

Figure 8:
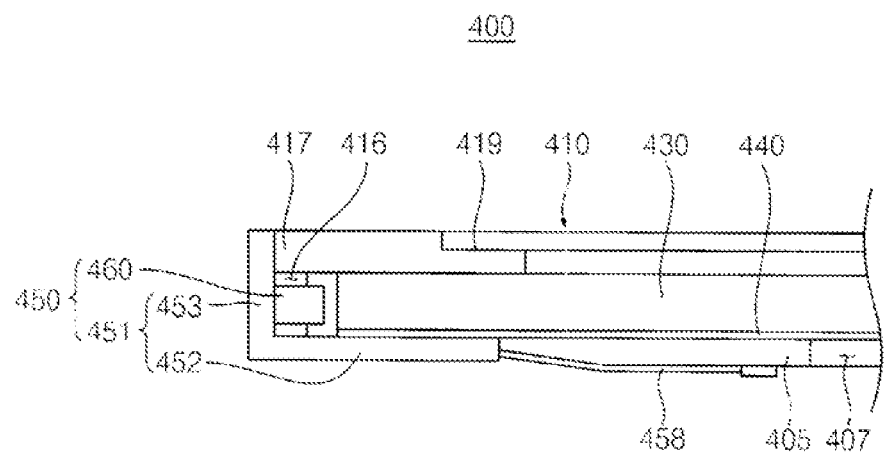
FIG. 8 is a cross-sectional view illustrating a backlight assembly according to still another example embodiment of the present invention.

FIG. 8 is a cross-sectional view illustrating a backlight assembly according to still another example embodiment of the present invention.

Referring to FIG. 8, the backlight assembly 400 according to the present example embodiment includes a receiving container 410, a light guide plate 430, a reflective sheet 440, and a back cover 450. The backlight assembly 400 is substantially the same as the backlight assembly 200 illustrated in FIGS. 3 to 6, except the receiving container 410 and the back cover 450. Thus, any further repetitive explanation concerning the above elements will be omitted.

The receiving container 410 is substantially the same as the receiving container 210 illustrated in FIGS. 3 to 6, except that a hole 416 is formed in a fourth side wall 417 of the receiving container 410. Thus, any further repetitive explanation concerning the above elements will be omitted.

The back cover 450 includes a cover element 451, a line portion, and a plurality of point light sources 460.

The cover element 451 has substantially the same shape as the cover element 251 illustrated in FIGS. 3 to 6. Thus, any further repetitive explanation concerning the above elements will be omitted. The cover element 451 includes a bottom cover portion 452 and a side cover portion 453. The bottom cover portion 452 includes a first opening portion formed in a bottom plate 405 of the receiving container 410. The side cover portion 453 is protruded from an edge of the bottom cover portion 452, to face an outside of a fourth side wall 417 of the receiving container 410.

The line portion includes an insulating layer, an input line, and a ground line. The line portion is substantially the same as the line portion explained in FIG. 7, and thus, any further repetitive explanation concerning the above elements will be omitted.

The point light sources 460 is substantially the same as the point light sources 260 explained in FIG. 6, except that the side cover portion 453 is mounted on the point light sources 460. Thus, any further repetitive explanation concerning the above elements will be omitted. The point light sources 460 are arranged along a longitudinal direction of the side cover portion 453 in a line. The point light sources 460 are inserted into a hole 416 formed in the fourth side wall 417, to be disposed to face a side surface of the light guide plate 430.

Display Apparatus

Figure 9:
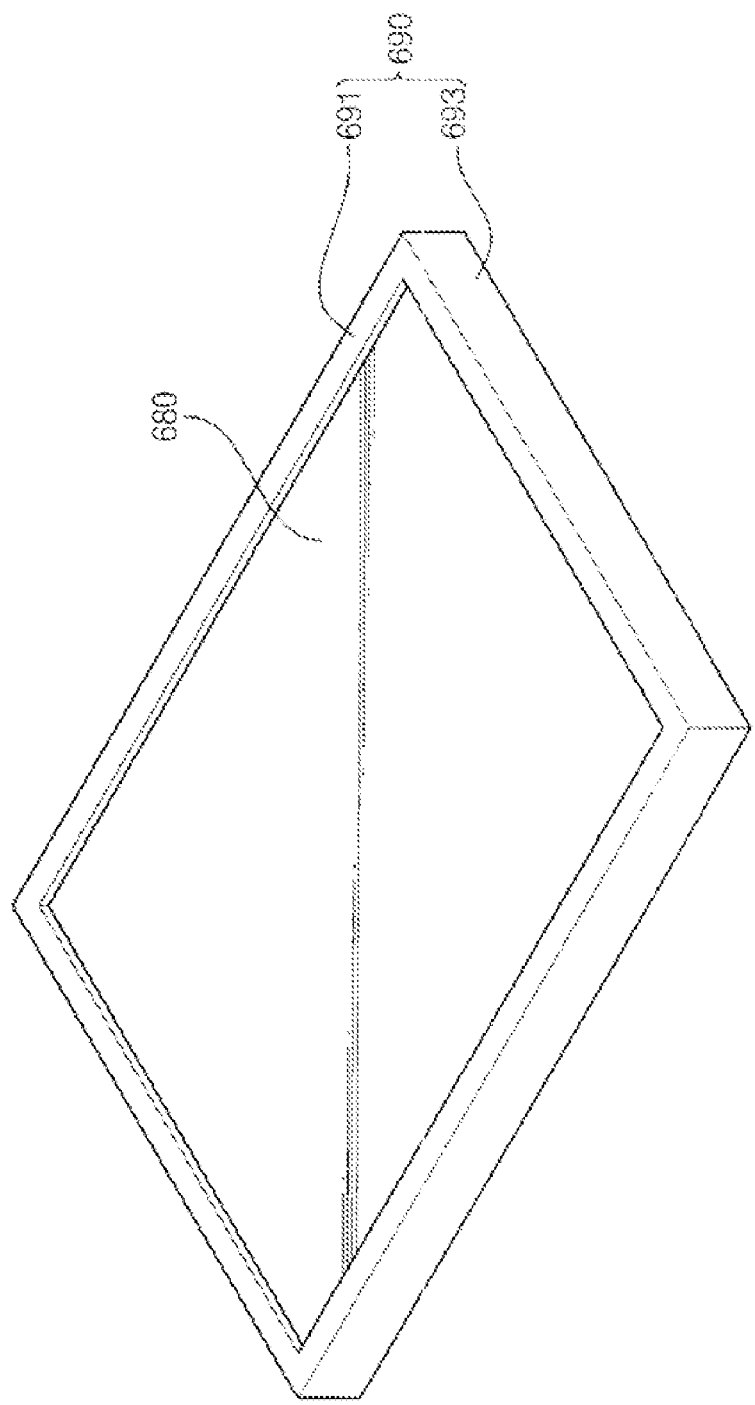
FIG. 9 is a perspective view illustrating a display apparatus according to an example embodiment of the present invention.
Figure 10:
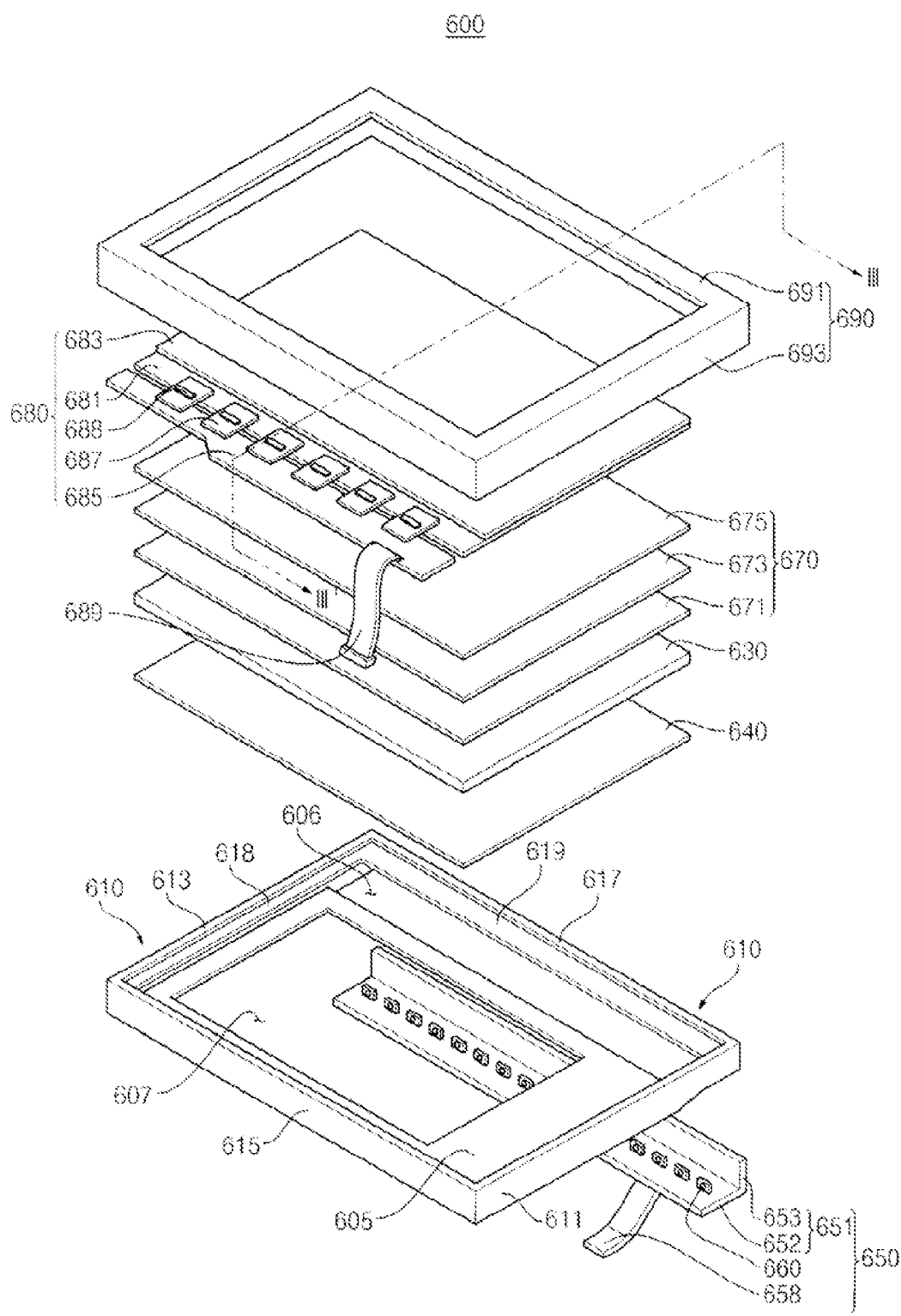
FIG. 10 is an exploded perspective view illustrating the display apparatus in FIG. 9.
Figure 11:
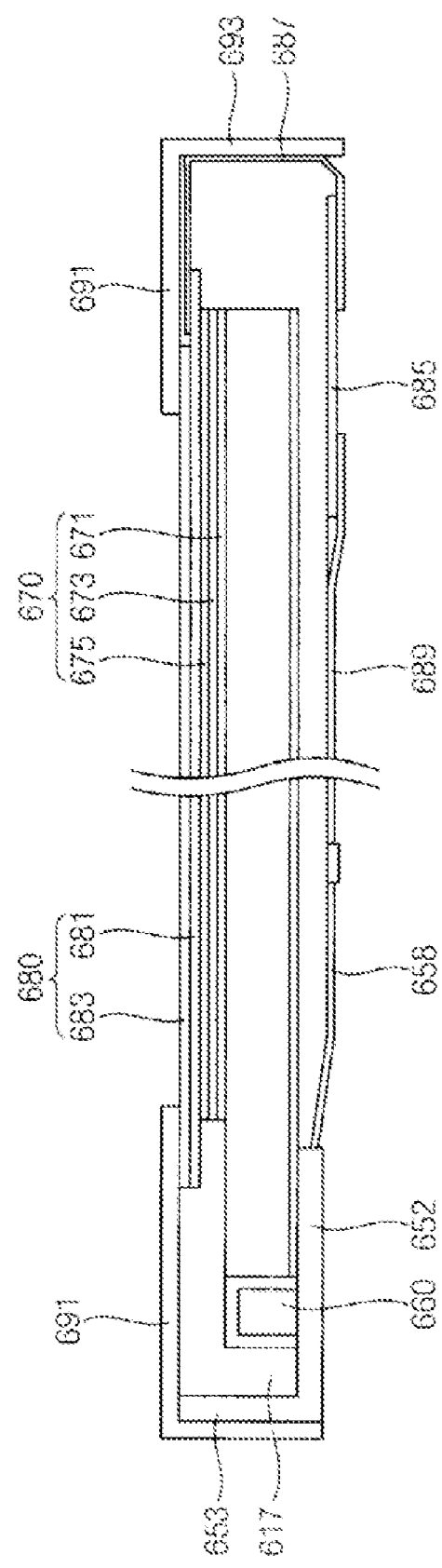
FIG. 11 is a cross-sectional view taken along the line III-III' of the display apparatus in FIG. 10.

FIG. 9 is a perspective view illustrating a display apparatus according to an example embodiment of the present invention. FIG. 10 is an exploded perspective view illustrating the display apparatus in FIG. 9. FIG. 11 is a cross-sectional view taken along the line III-III' of the display apparatus in FIG. 10.

Referring to FIGS. 9, 10 and 11, the display apparatus 600 according to the present example embodiment includes a receiving container 610, a back cover 650, a reflective sheet 640, a light guide plate 630, an optical sheet 670, and a display panel 680. The receiving container 610, the back cover 650, the reflective sheet 640, and the light guide plate 630 are substantially the same as the receiving container 210, the back cover 250, the reflective sheet 240 and the light guide plate 230 illustrated in FIGS. 3 to 6, and thus, any further repetitive explanation concerning the above elements will be omitted.

The optical sheet 670 is formed on the light guide plate 630. The optical sheet 670 enhances optical characteristics of light exiting from the light guide plate 630, to emit the light to an upper portion. The optical sheet 670 includes a diffusion sheet 671 and condensing sheets 673 and 675 that are sequentially formed.

The diffusion sheet 671 enhances brightness uniformity of the light exiting from the light guide plate 630. Condensing directions of condensing sheet 673 and 675 are substantially perpendicular to each other. The condensing sheets 673 and 675 enhance the brightness of the light exiting from the diffusion sheet 671 when viewed on a plane.

The display panel 680 is disposed on stepped portions 618 and 619 formed at a first side wall 611, a second side wall 613, a third side wall 615 and a fourth side wall 617. The display panel 680 receives the light exiting from the optical sheet 670 and converts the light into image light having a display image. The display panel 680 includes a first substrate 681, a second substrate 683, and a liquid crystal layer (not shown).

The first substrate 681 may include a plurality of pixel portions arranged in a matrix shape, and switching elements applying a data voltage to the pixel portions. The second substrate 683 is separated from the first substrate 681 by a predetermined distance, and faces the first substrate 681. The second substrate 683 has a smaller area than the first substrate 681. Thus, an edge of the first substrate 681 is exposed. The second substrate 683 may include a color filter portion corresponding to the pixel portions, and a common electrode.

A liquid crystal layer is disposed between the first and second substrates 681 and 683. An electric field is generated between the pixel portion and the common electrode, so that a longitudinal arrangement direction of liquid crystal molecules in the liquid crystal layer is changed. Thus, the light transmittance of the light passing through the liquid crystal layer is changed, so that the display panel 680 displays an image having a predetermined gray scale.

The display panel 680 may further include a panel driving part 685 and a printed circuit film 687. The printed circuit film 687 is adhered to an edge of the panel driving part 685 and the edge of the first substrate 681, to electrically connect the panel driving part 685 with the first substrate 681. The panel driving part 685 outputs a gate control signal and a data voltage that control switching elements.

Figure 12:
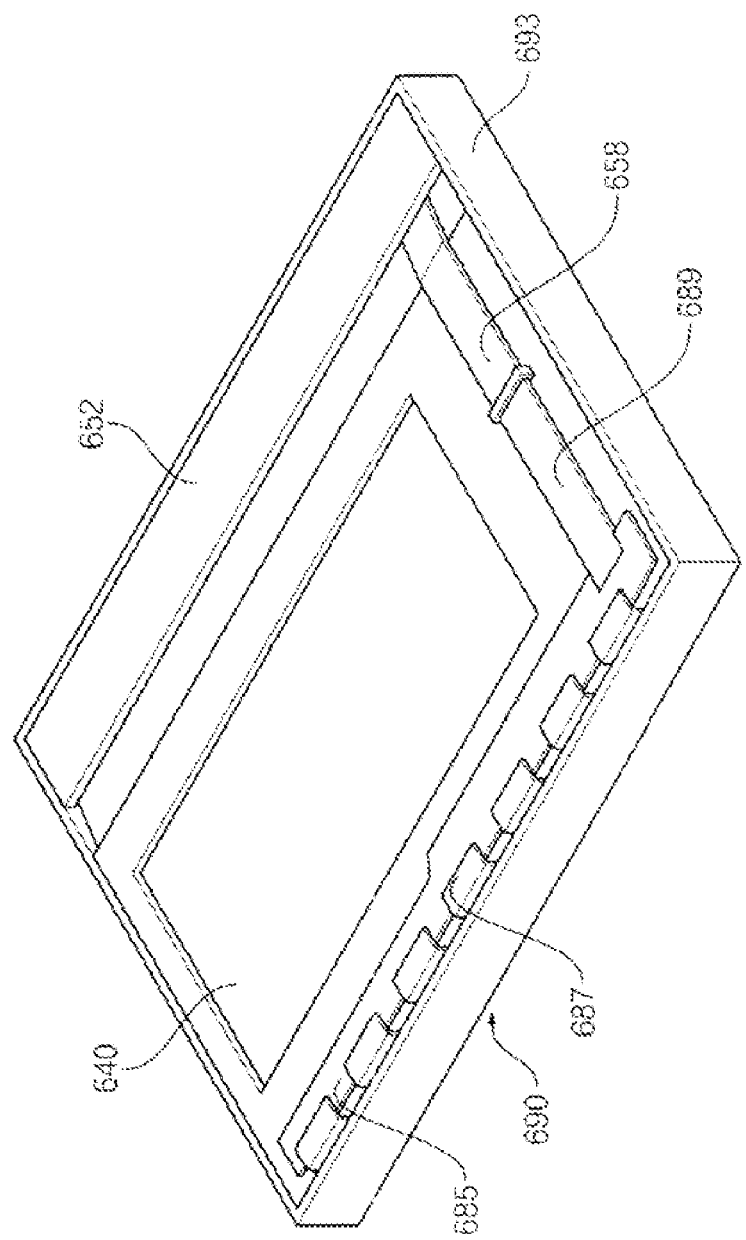
FIG. 12 is a perspective view illustrating a rear surface of the display apparatus in FIG. 10.

FIG. 12 is a perspective view illustrating a rear surface of the display apparatus in FIG. 10.

Referring to FIGS. 10, 11 and 12, the panel driving part 685 may further include a connecting cable 689. The panel driving part 685 outputs a power control signal controlling a driving voltage of the point light source 660, according to a feedback signal transferred from a ground line that is a power cable 658 and the connecting cable 689.

The panel driving part 685 is disposed along a first edge of the display panel 680. The back cover 650 is disposed along a fourth side wall 617 of the receiving container 610 corresponding to a second edge of the display panel 680 opposite to the first edge. As illustrated in FIG. 11, the printed circuit film 687 is curved, so that the panel driving part 685 is disposed on a rear surface of the bottom plate 605. The connecting cable 689 and the power cable 658 may be connected with each other on the rear surface of the bottom plate 605.

The display apparatus 600 may further include a bottom cover that covers the panel driving part 685, the back cover 650, the connecting cable 689, and the power cable 658.

The display apparatus 600 may further include a top cover 690. The top cover 690 includes a bezel portion 691 and a side wall 693. The bezel portion 691 covers a non-display area of the display panel 680. The side wall 693 covers the first side wall 611, the second side wall 613, the third side wall 615 of the receiving container 610, and a side cover portion 653 of the back cover 650.

According to the present invention, a back cover is used for a light source and a cover. Thus, the number of elements of a backlight assembly and a display apparatus having the back cover may be reduced.

In addition, the cover element has a substantially L-shape, so that the area on which the line portion is formed may be extended, although the area of the backlight assembly may not be increased.

Furthermore, the cover element is exposed to the exterior, and includes a metallic layer that may have a short dissipating or cooling time. Thus, the heat generated from point light sources may be more efficiently dissipated to the exterior.

Having described the example embodiments of the present invention and its advantage, it is noted that various changes, substitutions, and alterations can be made herein without departing from the spirit and scope of the invention as defined by appended claims.

What is claimed is:

1. A backlight assembly comprising:
   a receiving container including a bottom plate and a side wall extended from an edge of the bottom plate;
   a light guide plate disposed over the bottom plate; and
   a back cover coupled to the receiving container, the back cover including a cover element including a first portion and a second portion being protruded from the first portion, a plurality of point light sources being arranged along a longitudinal direction of the cover element, and a line portion to apply a driving voltage to the point light sources.

2. The backlight assembly of claim 1, wherein the second portion faces the side wall.

3. The backlight assembly of claim 2, wherein the second portion faces an inside of the side wall.

4. The backlight assembly of claim 3, wherein the point light sources are disposed on the second portion.

5. The backlight assembly of claim 1, wherein the first portion and the second portion comprise a metallic layer.

6. The backlight assembly of claim 5, wherein the line portion comprises:
   an insulating layer formed over the metallic layer; and an input line formed on the insulating layer and electrically connected to the point light sources to apply the driving voltage to the point light sources.

7. The backlight assembly of claim 6, wherein the line portion further comprises:
a ground line formed on the insulating layer and electrically connected to the point light sources to output a feedback signal.

8. The backlight assembly of claim 1, further comprising a reflective sheet disposed between the light guide plate and the first portion.

9. The backlight assembly of claim 1, wherein the back cover is coupled to the receiving container via a screw combination.

10. The backlight assembly of claim 1, wherein the back cover partially supports the light guide plate.

11. A display apparatus comprising:
a receiving container including a bottom plate and a side wall extended from an edge of the bottom plate;
a cover element including a bottom cover portion and a side cover portion facing the side wall;
a light guide plate disposed over the bottom plate and the bottom cover portion;
a plurality of point light sources arranged along a longitudinal direction of the side cover portion in a line, the point light sources facing a side surface of the light guide plate;
a line portion formed over the cover element to apply a driving voltage to the point light sources;
an optical sheet disposed over the light guide plate; and
a display panel disposed over the optical sheet.

12. The display apparatus of claim 11, wherein the cover element comprises a metallic layer dissipating a heat generated from the point light sources.

13. The display apparatus of claim 12, wherein the bottom cover portion and the side cover portion are substantially perpendicular to each other.

14. The display apparatus of claim 12, wherein the line portion comprises:

a plurality of lines electrically connected to the point light sources; and
an insulating layer insulating the lines from the metallic layer.

15. The display apparatus of claim 14, further comprising a pad portion formed at an edge portion of the cover element, wherein the lines are electrically connected to the pad portion.

16. The display apparatus of claim 15, further comprising:
a driving part disposed on a rear surface of the bottom plate, the driving part outputting a power control signal controlling the driving voltage; and
a power cable connected to the driving part and the pad portion.

17. The display apparatus of claim 11, wherein the bottom cover portion and the light guide plate are partially overlapped with each other.

18. The display apparatus of claim 11, further comprising a reflective sheet disposed between the bottom cover portion and the light guide plate.

19. A display apparatus comprising:
a receiving container including a bottom plate and a side wall extended from an edge of the bottom plate;
a light guide plate disposed over the bottom plate;
a back cover being coupled to the receiving container, the back cover including a cover element including a first portion and a second portion being protruded from the first portion, a plurality of point light sources being arranged along a longitudinal direction of the cover element, and a line portion to apply a driving voltage to the point light sources;
an optical sheet disposed over the light guide plate; and
a display panel disposed over the optical sheet.

20. The display apparatus of claim 19, wherein the cover element comprises a metallic layer dissipating a heat generated from the point light sources.

* * * * *